Jan. 12, 1965  A. R. T. BARNES  3,164,904
DENTAL INSTRUMENTS
Filed June 14, 1961
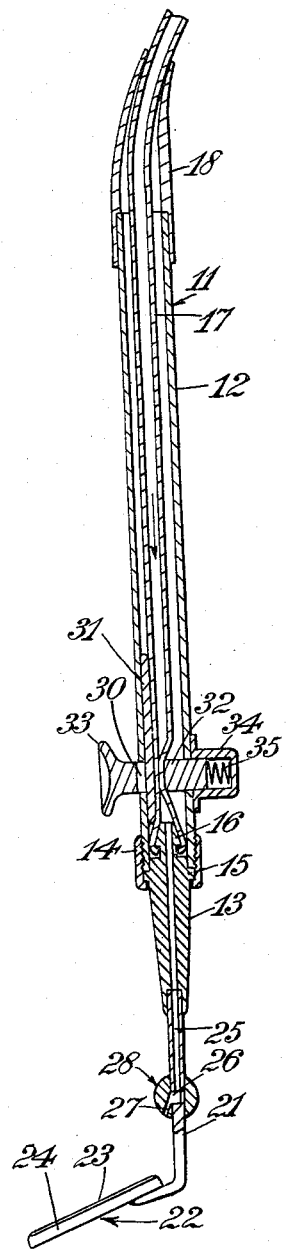

3,164,904
DENTAL INSTRUMENTS
Alonzo Roy Trevallon Barnes, 119 Trysull Road,
Bradmore, Wolverhampton, England
Filed June 14, 1961, Ser. No. 117,174
Claims priority, application Great Britain, July 13, 1960,
24,433/60
2 Claims. (Cl. 32—69)

The invention relates to dental instruments and is more particularly concerned with so-called "Dentists' mirrors." Such mirrors generally comprise an elongated handle carrying a small mirror arranged at an oblique angle to the length of the handle so that it can be passed into the patient's mouth and the patient's teeth viewed. When a dentist is working on a patient's teeth, for instance inserting a filling or scaling, the surface of the mirror tends to become covered with material obscuring the dentist's view. It is an object of the invention to provide an improved dentist's mirror in which this risk is eliminated or reduced.

The invention provides a dentist's mirror in which means are provided for directing a spray or other flow of fluid (e.g. water) over the surface of the mirror thereby to remove by a washing action matter collected or deposited thereon in use.

Preferably said means comprise a fluid-flow passage extending along the length of the handle and leading to an outlet directing the fluid-flow across the surface of the mirror.

Preferably the dentist's mirror comprises valve means for controlling the flow of fluid to the outlet, said valve means being such that when the mirror is held in one hand, the user can operate the valve means with that hand while maintaining his hold on the mirror.

One specific construction of a dentist's mirror embodying the invention will now be described by way of example with reference to the accompanying drawing which shows a longitudinal section through the mirror.

In this example the instrument 11 comprises a tubular handle 12 formed of stainless steel knurled over a portion of its length to facilitate it being gripped. The handle 11 is externally threaded at one end and a tapering fitting 13 is attached to that end of the handle by a cap nut 14. The fitting 13 is tubular and is provided with an external flange 15 which is clamped between the web of the cap nut 14 and the end of the handle 12. The fitting 13 is formed with a tubular nipple 16 which receives an end of a flexible rubber or plastic tube 17 which passes through the handle and is connected to a convenient source of fluid, e.g. water. A thick walled rubber sleeve 18 is passed over the other end of the handle 12 and prevents the flexible tube from being sharply bent or kinked in a manner which would interrupt the fluid flow.

The free end of the tapering fitting 13 is counterbored and internally threaded to receive an end of a cranked rod 21 carrying the mirror 22. The mirror is of conventional construction and comprises a mirror-disc 23 mounted in a shallow metal mounting 24 which is soldered to the rod 21. A bore 25 is formed axially into an end of the rod 21 and leads to a radial outlet 26. The outlet 26 registers with a radial bore 27 formed in a sphere or head 28 soldered to the rod 21. The bore 27 in the sphere directs a jet or spray of fluid onto the portion of the mirror adjacent the rod.

Flow of fluid through the flexible tube 17 is controlled by a valve means. These means comprise an anvil 31 secured to the internal wall of the handle 12 and presenting a slightly concave profile against which the flexible tube 17 normally rests. A valve member 32 passes radially through the handle and has an elongated generally oval shaped hole 30 through it. The anvil 31 and the tube 17 pass through the hole 30. The outer end of the valve member 32 is flared and shaped to provide a finger depression 33 and the other end passes into a cap-shaped member 34 secured to the wall of the handle 12. A compression spring 35 is interposed between the cap member 34 and the valve member 32 and acts to urge the valve member 32 towards the anvil 31. The spring 35 is selected so that it provides sufficient force to clamp the tube 17 against the anvil 31 and to prevent fluid flow. To permit fluid flow the dentist places a finger in the finger depression 33 and moves the valve member radially across the handle against the spring 35. The flexible tube 17 is then permitted to expand and fluid passes therethrough to the radial bore 27 in the sphere 28 and is directed against the surface of the mirror. Consequently if in use of the instrument 11 any matter falls on to the mirror, for example particles of filling or scale, the dentist can wash it off by operating the valve means. This can either be done actually in the patient's mouth in which case the water can be removed by a simple suction device, such as a suction hook of the kind commonly used by dentists, or the mirror can momentarily be removed from the patient's mouth.

The invention is not restricted to the details of the foregoing example. For instance, water may be conveyed to the mirror by a separate tube secured to the handle to extend along its length.

I claim:
1. A dentist's mirror comprising a mirror, an elongated hollow tubular structure having a transversely operable valve means, a collapsible supply tube in the said structure passing through the valve means, a one-piece removable head having an internal bore, and fitting on said elongated structure for the reception of cleaning fluid supplied through the collapsible supply tube, a nipple on the head through which nipple the bore passes and which nipple is located internally of the said structure, the collapsible supply tube being detachably attached to the nipple, a cranked rod one end of which is fitted in the bore and the other end of which cranked rod carries the mirror obliquely to the length of the tubular structure and an outlet bore in said cranked rod being in communication with and in downwardly divergent relation to said first mentioned bore and directed at an angle towards and upon the reflecting surface of the mirror at a substantial distance therefrom.

2. A dentist's mirror as claimed in claim 1 wherein the valve means comprises an anvil secured to the tubular structure, and a movable clamping member normally biased towards the anvil to collapse the collapsible supply tube but accessible from the exterior of said structure to permit the member to be moved against its bias to allow fluid flow.

References Cited by the Examiner
UNITED STATES PATENTS

| | | | |
|---|---|---|---|
| 2,228,169 | 1/41 | Keogh | 32—69 |
| 2,779,100 | 1/57 | Claessens | 32—69 |
| 2,843,019 | 7/58 | Larson | 88—104 |
| 2,984,009 | 5/61 | Codoni | 32—69 |
| 3,006,073 | 10/61 | McCarter | 32—69 |
| 3,027,644 | 4/62 | Piscitelli | 32—69 |
| 3,032,879 | 5/62 | Lafitte | 32—69 |

RICHARD A. GAUDET, *Primary Examiner.*

RICHARD J. HOFFMAN, JORDAN FRANKLIN, ROBERT E. MORGAN, *Examiners.*